UNITED STATES PATENT OFFICE.

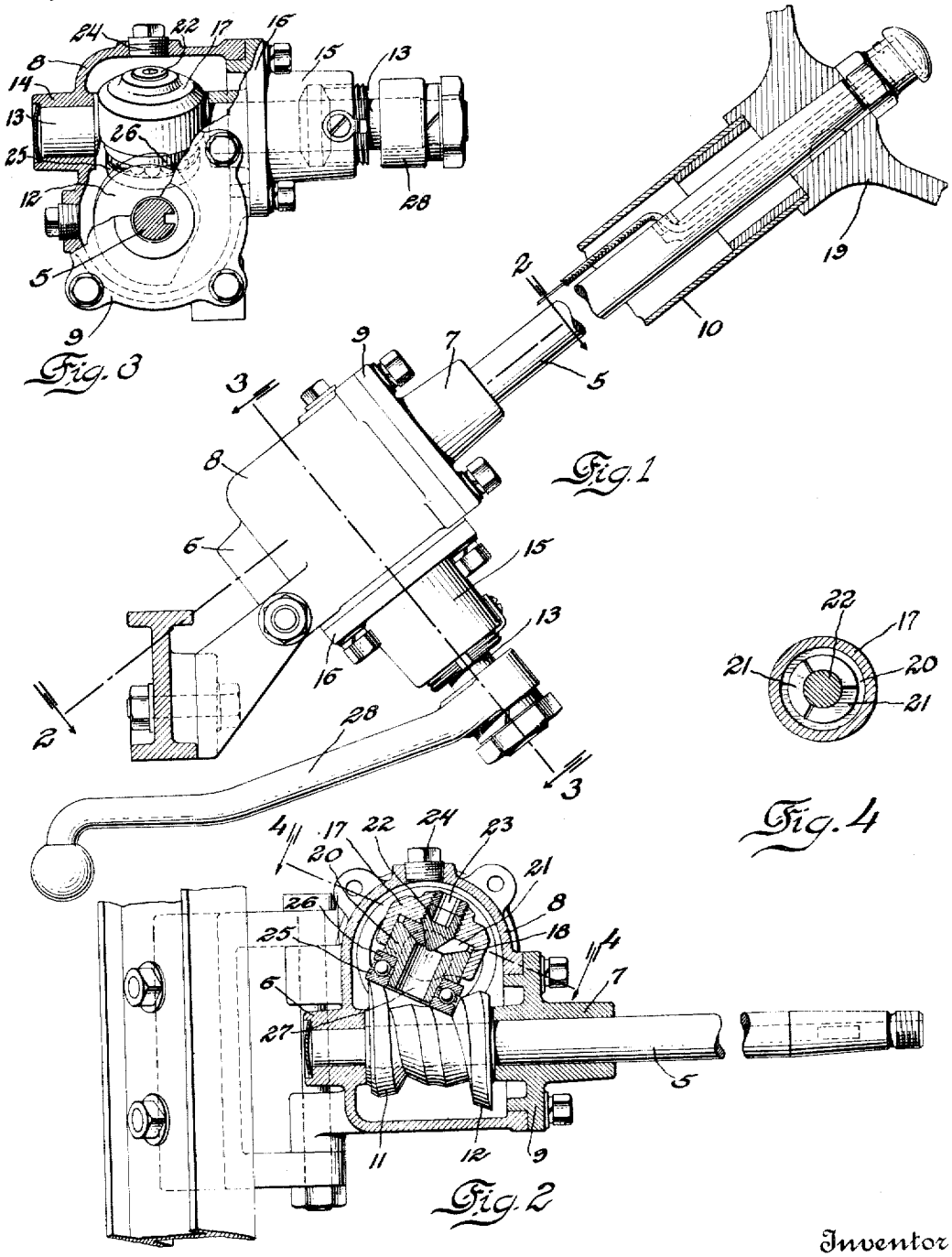

HARRY M. DENYES, OF SAGINAW, MICHIGAN, ASSIGNOR TO GENERAL MOTORS CORPORATION, OF DETROIT, MICHIGAN, A CORPORATION OF DELAWARE.

STEERING MECHANISM FOR MOTOR VEHICLES.

1,425,754.　　　　　　　Specification of Letters Patent.　　Patented Aug. 15, 1922.

Application filed October 17, 1921. Serial No. 508,344.

*To all whom it may concern:*

Be it known that I, HARRY M. DENYES, a citizen of the United States, and a resident of Saginaw, county of Saginaw, and State of Michigan, have invented certain new and useful Improvements in Steering Mechanism for Motor Vehicles, of which the following is a full, clear, concise, and exact description, such as will enable others skilled in the art to which the invention relates to make and use the same, reference being made therein to the accompanying drawings, which form a part of this specification.

My invention relates to steering mechanism for automobiles, motor trucks, and similar self-propelled vehicles, and particularly to steering mechanism of the general class or type in which two oppositely arranged cams carried by a rotatable steering shaft act to impart oscillatory motion to a shaft through a bearing member carried by said shaft, and which is always in engagement with both of said cams; examples of which type of steering mechanism are disclosed in the United States patents to H. J. Hert, No. 980,636, Jan. 3, 1911, for steering apparatus for automobiles, and H. Marles, No. 1,189,985, July 4, 1916, for steering gear for mechanically propelled vehicles; this present invention being in the nature of an improvement upon steering mechanism of the type to which the above mentioned patents relate.

The principal object of my invention is to provide means in steering mechanism of the type above referred to whereby such lost motion as may from time to time develop between the cams and the bearing member upon which they operate may be taken up, and back-lash or lost motion in the steering mechanism as a whole thus prevented. The features whereby the parts may be thus adjusted also provide steering mechanism in which such variations as occur in the manufacture of the various parts of the device may likewise be compensated for and a steering mechanism provided which will be free from back-lash when assembled and initially installed, and which may be kept free from looseness during the life of the mechanism by properly adjusting the same from time to time.

A further object of my invention is to provide an improved steering mechanism of the type or class above referred to which is simpler in construction, and which may be more readily manufactured, assembled and installed than has heretofore commonly been the case in steering mechanisms of the type in question.

With the above and other objects of invention in view, my invention consists in the improved steering mechanism illustrated in its preferred form in the accompanying drawing; and in such variations and modifications thereof as come within the scope of the concluding claims and such as will be obvious to those skilled in the art to which my invention relates.

In the drawing, Figure 1 is a view for the most part in side elevation showing my improved steering mechanism;

Figure 2 is a view upon a longitudinally extending plane indicated by the line 2—2, Figure 1;

Figure 3 is a view showing my improved steering mechanism partly in plan and partly in section upon a transverse plane indicated by the line 3—3, Figure 1.

Figure 4 is a fragmentary view showing a section upon a plane indicated by the line 4—4, Figure 2.

Referring to the drawing, the reference numeral 5 designates a rotatable steering shaft the lower end of which is supported in bearings 6, 7 provided in a suitable casing or housing 8 and in a head 9 removable from said housing, as shown in Figure 2, and which steering shaft or post is provided with the usual steering wheel 19 at its upper end. The steering shaft or post ordinarily extends through a suitable stationary housing 10 for supporting and protecting the same, although this is a feature with which this present invention is in no way concerned.

Secured to and partaking of the movement of the steering shaft 5 and located at the lower end thereof within the housing 8 are two oppositely arranged cam members 11, 12; these cams being preferably of the spiral or snail form so that a high point of one and a low point of the other lie in one and the same plane in all the angular positions of the cams, as will be understood from Figure 2 of the drawing.

The reference numeral 13 designates an oscillating shaft extending transverse to the steering shaft 5 and one end of which is supported in a bearing 14 in the housing 8, while the other end thereof is supported in a bearing 15 carried by a removable head 16 secured to the casing as best shown in Figure 3, so that the shaft may be introduced into the casing as the parts are assembled. This shaft is provided with an enlarged portion or boss 17 inside the casing, which boss is hollow and provides a cylindrical recess 18 facing toward the cam members 11, 12 hereinbefore mentioned.

Located within the cylindrical recess 18 of the oscillating shaft is a bearing member 20 which follows the cam members 11, 12 as the steering shaft 5 is rotated, and is always in contact with both said cams, and through which member oscillatory movement is imparted to the said shaft as the steering shaft is rotated. This bearing member is adjustable within the recess 18 in which it is housed so that the same may be moved toward and from the cam members to thereby take up such lost motion as may be present, or which may develop due to the wear of the parts; the bearing member as a whole being forced toward the cams to take up such lost motion as will be appreciated.

In the form of my invention illustrated this adjustment of the bearing member 20 is provided for by a hardened expansible bearing washer 21 located within the recess 18 and made up of three like wedge-shaped segments, as shown in Figure 4; which segments are forced apart and act as wedges between the top wall of the recess and the upper end of the bearing member and the bearing member itself thus forced against the cam members by a hollow set screw 22 engaging said washer and which screw in turn is locked in place by a hollow lock nut 23. The housing or casing 8 is provided with an opening opposite which the lock nut 23 and set-screw 22 lie when the oscillating shaft is in its middle position and through which a suitable tool may be introduced to manipulate the said elements to adjust the same, said opening being closed by a plug 24 after the parts have been properly adjusted.

The bearing member 20 is therefore adjustable relative to the oscillating shaft 13 whereby it is carried to thereby move its exposed contacting surface toward and from the cam members 11, 12. In the form of my invention illustrated the immediate contact between said bearing member and the cam members is provided by an annular hardened washer 25 which is supported from a second washer 26 through intermediate ball bearings as shown, the two washers surrounding an extension or neck 27 of the bearing member. These, however, as well also as the particular means provided for adjusting the bearing member may be variously modified within the scope of the concluding claims; and my invention is regarded as including other forms of adjustable bearing member for taking up lost motion in the mechanism due to lack of contact between the cam members and the bearing member, and is not limited to the particular form of bearing member and adjusting means therefor illustrated and hereinbefore described so long as such other forms come within the scope of the concluding claims.

The oscillating shaft 13 is provided with a steering arm 28 the free end of which is operatively connected with the front wheels of the vehicle through suitable link mechanism, and through which motion is communicated to said wheels in order to effect the steering of the vehicle, as will be understood.

In view of the premises, it will be appreciated that my invention provides a steering mechanism of the type hereinbefore referred to wherein the joint or connection between the cam members and the oscillating shaft may be adjusted if and when it becomes necessary to do so, and provides a steering mechanism in which such slight variations of size as commonly occur in the manufacture of elements intended to be identical one with another may be compensated for as the mechanism is assembled and installed and in which looseness or back-lash in the steering mechanism as a whole may be taken up from time to time and the parts kept tight and properly adjusted relative to one another.

Having thus described and explained my invention, I claim and desire to secure by Letters Patent:

1. In steering mechanism of the class described, a rotatable steering shaft; two oppositely arranged cam members carried by said shaft and located adjacent the lower end thereof; an oscillating shaft located adjacent said cams and extending transverse to said steering shaft; a bearing member carried by said oscillating shaft and with which both the cam members aforesaid engage, and which bearing member is located between the axes of said steering shaft and said oscillating shaft; and means for moving said bearing member transverse to said oscillating shaft and toward and from said cam members.

2. In steering mechanism of the class described, a rotatable steering shaft; two oppositely arranged cam members carried by said shaft and located adjacent the lower end thereof; an oscillating shaft adjacent said cams and extending transverse to said steering shaft and which shaft is provided with a recess adjacent said cam members; a bearing member located within said recess and with which both the cam members aforesaid engage; and means for adjusting said bearing member toward and from said cam members.

3. In steering mechanism of the class described, a rotatable steering shaft; two oppositely arranged cam members carried by said shaft and located adjacent the lower end thereof; an oscillating shaft located adjacent said cams and extending transverse to said steering shaft and which shaft is enlarged and provided with a cylindrical recess adjacent said cam members; a cylindrical bearing member located within said recess and with which the cam members aforesaid engage; and a set screw carried by said oscillating shaft and in operative engagement with said bearing member.

4. In a steering mechanism of the class described, a rotating steering shaft; two oppositely arranged cam members carried by said shaft and located adjacent the lower end thereof; an oscillating shaft located adjacent said cams and extending transverse to said steering shaft, and which shaft is enlarged intermediate its ends and is provided with a cylindrical recess; a cylindrical bearing member located within said recess; a bearing washer located within said recess and in engagement with said bearing member; a set screw carried by said oscillating shaft and adapted to engage said bearing washer; and an annular bearing washer carried by said bearing member and with which both the cam members aforesaid engage.

5. In steering mechanism of the class described, a suitable housing; a rotatable steering shaft supported in bearings carried by said housing; two oppositely arranged cam members carried by said shaft and located within said housing; an oscillating shaft supported in bearings carried by said housing and extending transverse to said steering shaft; a bearing member carried by said oscillating shaft and with which both the cam members aforesaid engage; and means accessible through an opening provided in said housing for adjusting said bearing member relative to said oscillating shaft and toward and from said cam members.

In testimony whereof I affix my signature.

HARRY M. DENYES.